C. A. & O. W. HULT.
OUTBOARD MOTOR.
APPLICATION FILED JULY 3, 1913.
1,146,427.
Patented July 13, 1915.
3 SHEETS—SHEET 2.
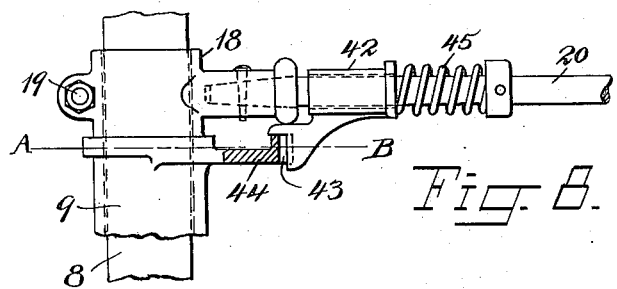
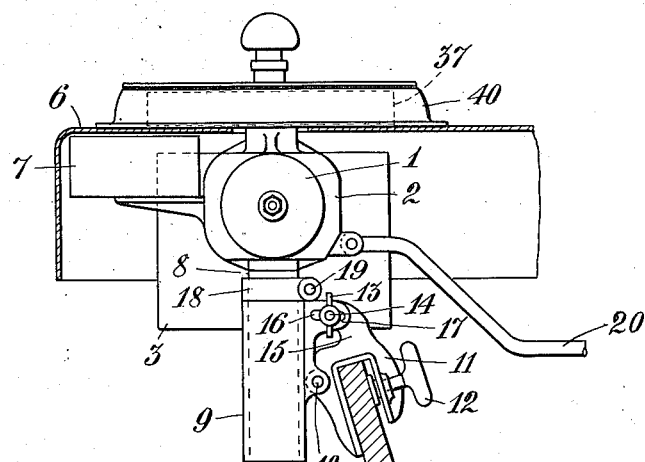
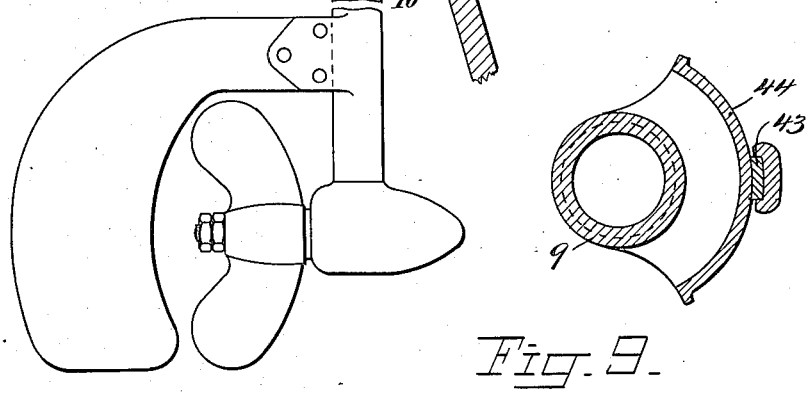
Witnesses
Inventors
Carl Alrik Hult
Oscar Walfrid Hult
by
their Attorney C. A. & O. W. HULT.
OUTBOARD MOTOR.
APPLICATION FILED JULY 3, 1913.
1,146,427.
Patented July 13, 1915.
3 SHEETS—SHEET 3.
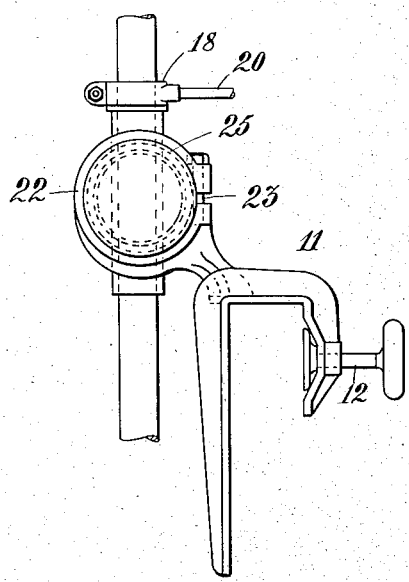
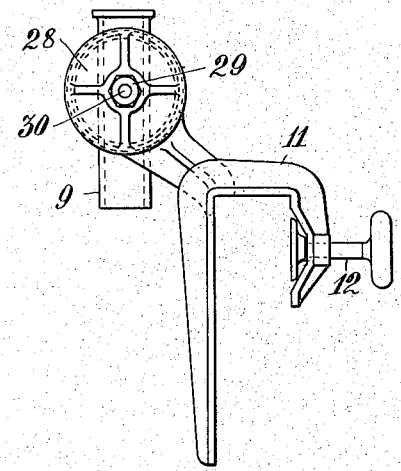
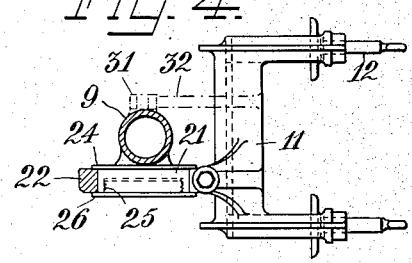
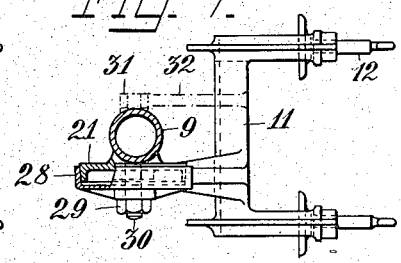
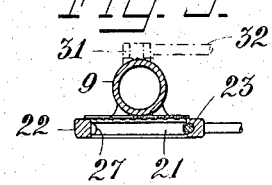

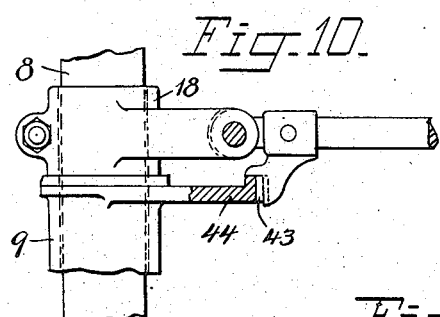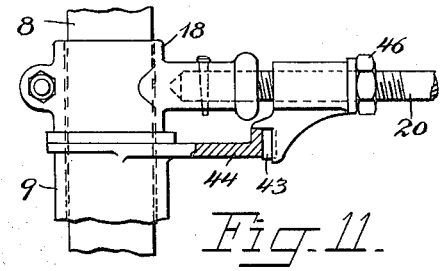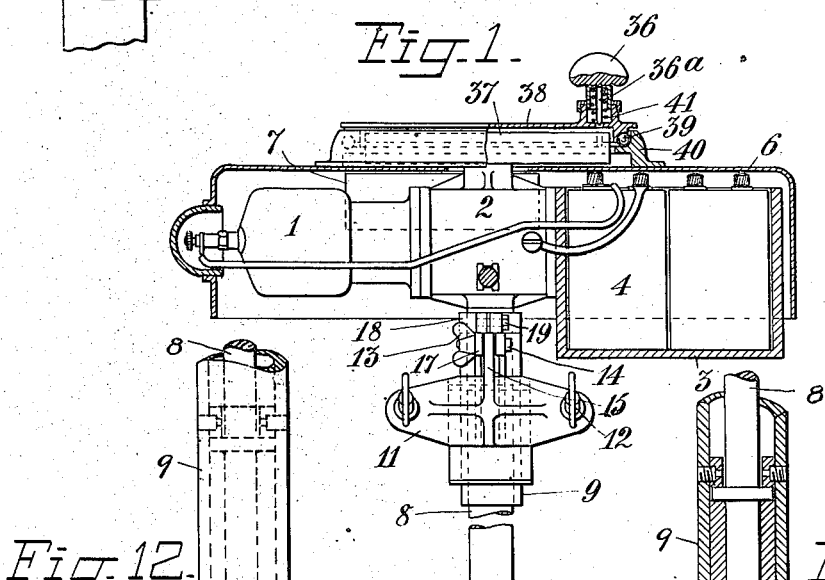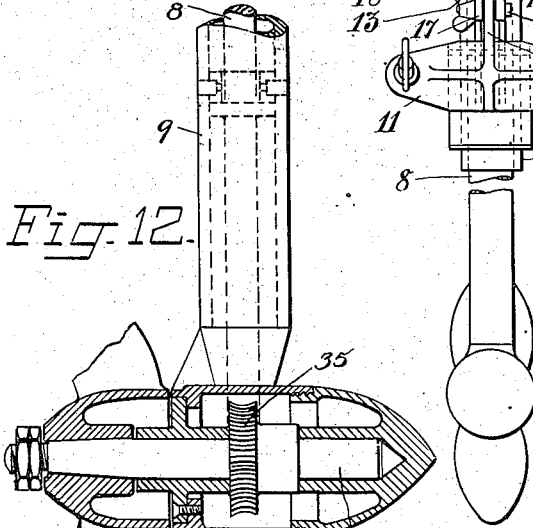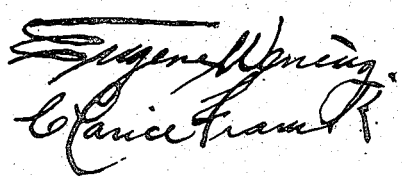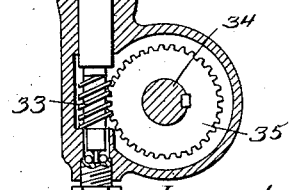

UNITED STATES PATENT OFFICE.

CARL ALRIK HULT AND OSCAR WALFRID HULT, OF STOCKHOLM, SWEDEN.

OUTBOARD MOTOR.

1,146,427.   Specification of Letters Patent.   Patented July 13, 1915.

Application filed July 3, 1913. Serial No. 777,152.

*To all whom it may concern:*

Be it known that we, CARL ALRIK HULT and OSCAR WALFRID HULT, subjects of the King of Sweden, and residents of 1 Inedalsgatan, Stockholm, in the Kingdom of Sweden, engineers, have invented certain new and useful Improvements in Outboard Motors, of which the following is a specification, reference being made to the accompanying drawings.

Outboard motors constructed in accordance with the present invention are chiefly characterized by the fact that the motor can be turned around a vertical (or somewhat inclined) axis (*e. g.* the center line of the motor shaft). As a result of this arrangement the motor can be fixed to the boat in a simple and suitable manner and the steering device is materially simplified. A simple and suitable method of supporting the motor is to place the sleeve which, usually, surrounds the motor shaft (hereinafter called the "shaft sleeve") in a second sleeve (hereinafter called the "fixing sleeve"), which latter sleeve is pivotally connected with that part of the supporting device of the motor which is fixed to the boat, the shaft sleeve also being adjustable in the fixing sleeve. By this arrangement the propeller can in a simple manner be adjusted into the position desired independently of the various shapes and sizes of different boats at the stern.

Not merely the motor itself can be turned around a vertical (or somewhat inclined) axis, but parts appurtenant thereto, *e. g.* the battery for the ignition of the explosive charges or an equivalent device, the fuel tank, etc., are rotatable with the motor. In this manner the motor itself is more directly connected with its appurtenant parts, the entire installation is easily protected against rain and the like by means of a common casing, and all connections which might interfere with the turning of the motor are eliminated.

The invention is illustratively exemplified in the accompanying drawings, wherein—

Figure 1 is a front elevational view, with parts in section, of a motor embodying our invention. Fig. 2 is an end elevational view thereof; Fig. 3 is an elevational view of modified means for securing the motor to a boat; Fig. 4 is a top plan view, with parts in section, of the construction illustrated in Fig. 3; Fig. 5 is a similar view to Fig. 4 of modified means for retaining the fixing sleeve in position; Fig. 6 is an elevational view of a still further modified form of means for securing the motor to a boat; Fig. 7 is a top plan view, with parts in section, of the construction illustrated in Fig. 6; Fig. 8 is an elevational view, with a part in section, of means for counteracting the tendency of the propeller to turn the tiller; Fig. 9 is a horizontal sectional view on the line A—B of Fig. 8; Fig. 10 is an elevational view, with a part in section, of a modified form of the structure shown in Fig. 8; Fig. 11 is an elevational view, with a part in section, of a still further modified form of the structure shown in Fig. 8; Fig. 12 is an elevational view, partly in section, and Fig. 13 is a vertical sectional view, of the motor shaft and propeller shaft and a form of gearing therebetween.

The motor shown by way of example is a one-cylinder motor. The motor cylinder 1 is fixed to one end of the crank casing 2 of the motor, at the other end of which crank casing is fixed a box 3, containing the electric ignition device (cells 4 and parts appertaining thereto).

The motor and the ignition device are covered and surrounded by a hood 6 fixed to the motor and thus participating in its turning. The roof of this hood carries a starting device. In the hood 6 there is also the benzin tank 7 likewise turning with the motor.

In outboard motors now in use the starting handle placed on the fly wheel of the motor, rotates at a high speed, when the motor is running, involving danger to persons and property. In order to obviate this danger the handle 36 is fixed to a part or disk 38, rotatable concentrically with the fly wheel 37 of the motor (or other part rotating with the motor shaft), said part or disk running in a circular path 40 fixed on the hood 6. The starting handle 36 is mounted on the disk 38 in such a manner that it can be moved toward the fly wheel 37, but is automatically (by a spring 41) carried back, when it is no longer being acted upon. The fly wheel is provided with one or more holes, into which the tapering end of the handle spindle 36$^a$ fits. When the motor is to be started, the handle is pressed downward, the spindle 36$^a$ then passing into the hole, or one of the holes, of the fly wheel. Then the disk 38 is revolved, so that the motor is set in motion, whereupon the handle 36 is left free, so that it is carried back actuated by the spring 41, and immediately afterward the freely running disk 38 stops of its own accord.

As in other outboard motors there depends from the crank casing 2 a sleeve 8 (the shaft sleeve) surrounding the motor shaft. In outboard motors constructed in accordance with this invention, the shaft sleeve 8 is surrounded by a sleeve 9 (the fixing sleeve), which is pivotally connected with that part of the supporting device which is fixed to the boat, besides which the shaft sleeve can be adjusted at different heights in the fixing sleeve. By means of this arrangement a motor can be attached to boats of a great variety of sizes and shapes at the stern.

In the device illustrated in Figs. 1 and 2 the fixing sleeve 9 surrounding the motor sleeve 8 is by means of a pivot 10 pivotally connected with a bow piece 11, which is fixed to the boat by means of clamping screws 12. When the fixing sleeve has been adjusted relatively to the bow piece 11 fixed to the boat, so that the motor shaft is vertical, the said fixing sleeve is locked in its position in a suitable manner, e. g. by tightening a wing nut 13 placed on a bolt 14 provided with a head, which bolt 14 is mounted in a projection 15 on the bow piece 11 and passes through curved grooves 16 in projections or ears 17 on the fixing sleeve and embracing the projection 15. At the upper end of the fixing sleeve 9 rests a clamping ring or bow 18, by means of which the propeller is held at the desired height. By loosening and again tightening the screw bolt 19 passing through the ends of the clamping bow 18, the said clamping bow can be placed at a desired place on the shaft sleeve, and thus the height of the propeller can be adjusted according to the height of the stern of the boat. In the arrangement shown in Figs. 1 and 2, the tiller 20 is fixed to the crank casing 2.

In the modified form of invention shown in Figs. 3 and 4 the fixing sleeve 9 is placed at one side of a ring or disk 21, which is embraced by a clamping bow 22 placed on the bow piece 11, said clamping bow 22 being tightened around the disk by means of a screw bolt 23, so that the disk is locked in the position into which it has been adjusted. In order to retain the disk 21 in the clamping bow 22, even when the bow is not tightened around the disk, the latter is provided with a flange 24 resting against one side of the clamping bow, and there is also screwed into the disk a ring or disk 25, provided with a flange 26, which rests against the other side of the clamping bow. As shown in Fig. 3, the tiller 20 may be fixed in the clamping bow 18.

The arrangement shown in Fig. 5 differs from the arrangement just described with reference to Figs. 3 and 4, merely in the fact that the disk 21 is provided on its circumference with a groove 27, into which enters the bolt 23, thereby preventing the disk from leaving the clamping bow, when the latter has been loosened. Instead of consisting of a single springy part, the clamping bow 22 may consist of two parts, pivotally connected with one another.

In the arrangement shown in Figs. 6 and 7 the clamping bow 22 is replaced by a ring or disk 28, likewise mounted on the bow piece 11, the ring or disk 28 having an inwardly directed conical surface, against which the correspondingly formed circumference of the ring or disk 21 is held steadily pressed, e. g. by means of a nut 29 resting against the disk 28 and mounted on a threaded pin 30 which is fixed in the disk 21.

As is shown by dotted lines in Figs. 4, 5 and 7, the fixing sleeve 9—if this is considered necessary in order to obtain greater strength and steadiness—may on its side turned away from the ring or disk 21 be provided with a pivot 31, journaled in an arm 32 extending from the bow piece 11.

As is known, a propeller tends to turn its shaft, or a rudder connected with it, out of the direction which the propeller shaft or rudder ought to occupy for steering a certain course. In order to obviate, more or less, this drawback, so that the steersman is in a greater or less degree relieved of the inconvenience caused by the said tendency, a checking or braking device can be placed between the part acted on in the steering and a part fixed relatively to the boat. Figs. 8 to 11 show different forms of a device for this purpose. According to Fig. 8 the tiller 20 (tiller is here understood to mean the rod or equivalent part which is acted upon in the steering, whether the latter is effected by means of a rudder or by means of the propeller, or both) fixed in the clamping bow 18 is surrounded by a sleeve 42, carrying a brake shoe 43, which coöperates with a brake path 44 arranged on the fixing sleeve 9. The tiller is surrounded by a spiral spring 45, which presses the brake shoe against the brake path.

In the arrangement indicated in Fig. 10, the tiller 20 is pivotally fixed to the clamping bow 18, so that the brake shoe 43 is pressed against the brake path by pressing the tiller downward.

The arrangement shown in Fig. 11 is a modification of the arrangement indicated in Fig. 8 in so far as the spring 45 is replaced by a nut 46, with the aid of which the brake shoe 43 is pressed more or less hard against the brake path 44.

In Figs. 12 and 13 is shown a form of gearing between the motor shaft or an extension of the same and the propeller shaft. This arrangement, which is suitable particularly in cases where the motor shaft rotates with a speed which must be reduced in transmitting to the propeller shaft, consists therein that the motor shaft (or its extension) below forms, or is provided with, a worm 33, which engages with a worm wheel 35 mounted on the propeller shaft.

Although the present invention is shown applied to a one-cylinder motor, it can obviously also be applied to motors with two or more cylinders.

Having now described our invention, what we claim as new and desire to secure by Letters Patent is:

1. In a device of the class described, the combination of a boat, a motor therefor having an extended motor shaft and a sleeve inclosing said shaft, a second sleeve in which said first named sleeve and the parts appurtenant thereto are longitudinally adjustable, a substantially annular clamping ring, encircling said first named sleeve and movable along the same, said clamping ring being adapted to abut said second named sleeve and retain the first named sleeve and its appurtenant parts in longitudinally adjusted position, a clamp attachable to said boat, a connection between said clamp and said second named sleeve whereby the angular relation of said parts may be adjusted, means whereby said parts may be locked in adjusted position, and a tiller operatively connected to said clamping ring.

2. In a device of the class described, the combination of a boat, a motor therefor having an extended motor shaft and a sleeve inclosing said shaft, a second sleeve in which said first named sleeve and the parts appurtenant thereto are longitudinally adjustable, a substantially annular clamping ring encircling said first named sleeve and movable along the same, said clamping ring being adapted to abut said second named sleeve and retain the first named sleeve and its appurtenant parts in longitudinally adjusted position, a clamp attachable to said boat, a connection between said clamp and said second named sleeve whereby the angular relation of said parts may be adjusted, means whereby said parts may be locked in adjusted position, a tiller operatively connected to said clamping ring, and means for braking the action of said tiller.

3. In a device of the class described, the combination of a boat, a motor therefor having an extended motor shaft and a sleeve inclosing said shaft, a second sleeve in which said first named sleeve and the parts appurtenant thereto are longitudinally adjustable, a substantially annular clamping ring encircling said first named sleeve and movable along the same, said clamping ring being adapted to abut said second named sleeve and retain the first named sleeve and its appurtenant parts in longitudinally adjusted position, a clamp attachable to said boat, a connection between said clamp and said second named sleeve whereby the angular relation of said parts may be adjusted, means whereby said parts may be locked in adjusted position, a tiller operatively connected to said clamping ring, and means for braking the action of said tiller, said last named means including a brake shoe carried by said tiller and a brake path engaged by said shoe.

4. In a device of the character described, the combination of a boat, a motor therefor provided with a fly wheel, means whereby said motor may be vertically adjusted in relation to said boat, means whereby the angular relation of said motor to said boat may be adjusted, a loosely revoluble disk concentric with said fly wheel, and a yieldingly mounted starting handle carried by said disk and adapted to releasably connect the latter to the fly wheel.

In witness whereof we have hereunto set our hands in presence of two witnesses.

CARL ALRIK HULT.
OSCAR WALFRID HULT.

Witnesses:
CARL TH. SUNDHOLM,
H. S. OHLSSEN.